(12) United States Patent
Sutherland (10) Patent No.: US 6,292,898 B1
(45) Date of Patent: *Sep. 18, 2001

(54) ACTIVE ERASURE OF ELECTRONICALLY STORED DATA UPON TAMPER DETECTION

(75) Inventor: Mark J. Sutherland, Milpitas, CA (US)

(73) Assignee: Spyrus, Inc., San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1 days.

(21) Appl. No.: 09/018,451

(22) Filed: Feb. 4, 1998

(51) Int. Cl.[7] .................................................... G06F 15/00
(52) U.S. Cl. ........................... 713/200; 713/193; 713/194
(58) Field of Search ..................................... 713/200, 201, 713/189, 190, 191, 192, 193, 194; 710/200, 260, 261, 267; 714/769

(56) References Cited

U.S. PATENT DOCUMENTS

| | | | | |
|---|---|---|---|---|
| 4,507,654 | * | 3/1985 | Stolarczyk et al. | 340/545 |
| 4,575,621 | | 3/1986 | Dreifus | 235/380 |
| 4,613,848 | * | 9/1986 | Watkins | 340/541 |
| 4,804,865 | * | 2/1989 | Clark, II | 307/297 |
| 4,860,351 | | 8/1989 | Weingart | 380/3 |
| 4,882,752 | | 11/1989 | Lindman et al. | 380/25 |
| 4,888,738 | * | 12/1989 | Wong et al. | 365/128 |
| 4,962,531 | | 10/1990 | Sipman et al. | 380/24 |
| 5,117,457 | * | 5/1992 | Comeford et al. | 380/3 |
| 5,153,918 | | 10/1992 | Tuai | 380/25 |
| 5,249,227 | | 9/1993 | Bergum et al. | 380/4 |
| 5,388,156 | | 2/1995 | Blackledge, Jr. et al. | 380/4 |
| 5,440,321 | | 8/1995 | Hine, Jr. | 345/1 |
| 5,457,748 | | 10/1995 | Bergum et al. | 380/50 |
| 5,477,952 | | 12/1995 | Castellano et al. | 194/200 |
| 5,533,123 | | 7/1996 | Force et al. | 380/4 |
| 5,555,373 | | 9/1996 | Dayan et al. | 395/188.01 |
| 5,574,786 | | 11/1996 | Dayan et al. | 380/4 |
| 5,603,038 | | 2/1997 | Crump et al. | 395/750 |
| 5,610,981 | * | 3/1997 | Mooney | 380/25 |
| 5,613,012 | | 3/1997 | Hoffman et al. | 382/115 |
| 5,826,009 | * | 10/1998 | Feng | 713/200 |
| 5,945,915 | * | 8/1999 | Cromer et al. | 340/686.1 |
| 6,182,223 | * | 1/2001 | Rawson | 713/200 |

FOREIGN PATENT DOCUMENTS

| | | |
|---|---|---|
| 3347483 | 7/1985 | (DE) . |
| 0417447 | 3/1991 | (EP) . |
| 0479461 | 4/1992 | (EP) . |
| 0709759 | 5/1996 | (EP) . |
| WO 88/08176 | 10/1988 | (WO) . |

* cited by examiner

Primary Examiner—Thomas Lee
Assistant Examiner—Rijue Mai
(74) Attorney, Agent, or Firm—David R. Graham (57) ABSTRACT

The invention provides additional protection for data stored in a data storage device situated within a secure environment by using active erasure to erase the stored data when an intrusion into the secure environment is detected. Active erasure effects erasure of data in a data storage device much more rapidly than passive erasure, so that the erasure of data cannot be prevented by a tamperer before the data is erased. Active erasure also enables data to be rapidly erased without requiring use of a processor (and, in some cases, additional devices) to effect the erasure or other destruction of data, which use is relatively complex and expensive, can be disabled in some situations, and cannot guarantee destruction of data in situations in which insufficient power may be available to operate the processor. The invention has particular utility when used with a volatile data storage device that is situated within a secure environment and connected to a power supply. Though the invention can be used to protect data stored in any such volatile data storage device, the invention can be particularly useful when implemented in a secure device (and, even more particularly, in such secure device that is portable) that uses a backup power supply (such as a battery) to maintain storage of data in the volatile data storage device when the secure device is not operating (i.e., connected to a primary power supply).

36 Claims, 3 Drawing Sheets

ACTIVE ERASURE OF ELECTRONICALLY STORED DATA UPON TAMPER DETECTION

BACKGROUND OF THE INVENTION

1. Field of the Invention

This invention relates to protection of electronically stored data from tampering and, in particular, to preventing ascertainment of the content of data stored in a data storage device situated in a secure environment.

2. Related Art

Computational devices and/or related peripheral devices often include a data storage device. In some situations, the content of the data stored in a data storage device may be particularly sensitive, so that the data storage device is situated within a secure environment, such as the enclosure within a mechanically sealed housing. (Such a data storage device is sometimes referred to herein as a "secure data storage device" and the device of which the data storage device is part is sometimes referred to herein as a "secure device.") However, even secure environments are susceptible to intrusion: it may be possible to pry open a mechanically sealed housing, for example. Thus, even when a secure environment has been provided for a data storage device that stores sensitive data, it can be desirable to provide additional security for the data storage device. Such additional security can comprise erasing or otherwise destroying the stored data when an intrusion into the secure environment is detected.

Generally, a data storage device can be either non-volatile (i.e., data continues to be stored in the data storage device even after the application of power to the data storage device is ceased) or volatile (i.e., data stored in the data storage device is lost after the application of power to the data storage device is ceased). Volatile data storage devices typically include a multiplicity of data storage elements (memory cells) that can each store one of two different values. The capacity of a volatile data storage device to store two different values in a memory cell (i.e., to store data) depends upon the maintenance of two distinct voltage levels within the volatile data storage device, which, in turn, requires a continual supply of power to the volatile data storage device, as indicated above.

It can be desirable to embody a secure data storage device with a volatile data storage device ("secure volatile data storage device"), such as a random access memory (RAM), because, as will be clear from the description below, when an intrusion into the secure environment is detected, data stored in a volatile data storage device can more easily be erased or otherwise destroyed than can data stored in a nonvolatile data storage device.

In some situations it can be desirable to make a volatile data storage device effectively non-volatile. This can be done by using a backup power supply (i.e., a power supply, such as a battery, to which the volatile data storage device can be connected when the device of which the volatile data storage device is part is not operating) to continue to supply power to the volatile data storage device after a primary power supply (i.e., a power supply to which the volatile data storage device is connected during operation of the device of which the volatile data storage device is part) has been disconnected from the volatile data storage device. In particular, in portable devices (which are frequently not connected to a primary power supply), it can be desirable to provide a backup power supply to enable a volatile data storage device of the portable device to be made non-volatile. The construction of a "non-volatile data storage device" by providing a backup power supply for a volatile data storage device can be desirable because, as made clearer by the description below, such construction enables non-volatilely stored data to be more easily erased or otherwise destroyed, if tampering with the data storage device is detected, than would be the case if the data storage device was embodied by a conventional non-volatile data storage device.

Figure 1:
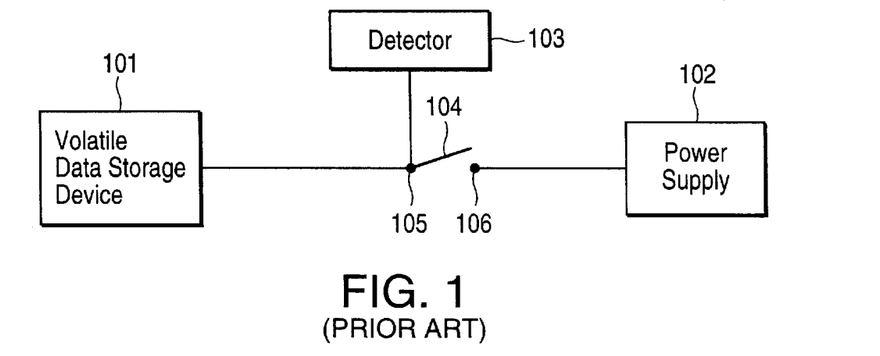
FIG. 1 is a block diagram illustrating the functional components of a previous system for protecting data stored in a volatile data storage device that is situated within a secure environment and connected to a power supply.

FIG. 1 is a block diagram illustrating the functional components of a previous system for protecting data stored in a volatile data storage device that is situated within a secure environment and connected to a power supply. A volatile data storage device 101 that is situated within a secure environment is initially electrically connected to a power supply 102 (i.e., a switch 104 is configured to make electrical connection between the nodes 105 and 106) so that data can be continually stored in the volatile data storage device 101. A detector 103 is adapted to detect an intrusion into the secure environment. When an intrusion is detected, the switch 104 changes configuration so that the power supply 102 is disconnected from the volatile data storage device 101 (as shown in FIG. 1). Since power is no longer supplied to the volatile data storage device 101, electrical charge within the volatile data storage device 101 gradually flows so that two distinct voltages are no longer present in the volatile data storage device 101, i.e., the data in the volatile data storage device 101 is lost. Erasure (sometimes referred to as "zeroization") in this manner of data stored in a volatile data storage device is generally referred to herein as "passive erasure" (or "passive zeroization").

If the volatile data storage device consumes relatively little power in operation (such as is often the case in small portable devices) and/or the volatile data storage device operates at voltage levels that differ in magnitude by a relatively large amount, passive erasure can take an undesirably long time (e.g., tens of seconds) to erase the data stored in the volatile data storage device. For example, portable digital assistants (PDAs) typically are constructed to be relatively low power devices such that passive erasure of the data stored in a volatile data storage device of the PDA would take about 30 seconds. This amount of time can enable a tamperer to re-establish the connection between the power supply and the volatile data storage device, or provide a substitute power supply, so that the data stored within the volatile data storage device is preserved. For example, a device can include a secure volatile data storage device situated in an enclosure within a mechanically sealed housing, the device constructed so that prying open the housing breaks electrical connection between the volatile data storage device and a power supply. A tamperer, after prying open the housing of such a device, may be able to, with sufficient familiarity with the device (which could be obtained, for example, from previous intrusions into one or more similar devices), attach jumpers to appropriate nodes of the device to re-establish the broken electrical connection or provide a substitute power supply, so that, from the perspective of the volatile data storage device, it appears that no intrusion has occurred. If the tamperer can accomplish this before the data has been erased from the volatile data storage device by passive erasure (e.g., within several seconds), the tamperer can then use known techniques to ascertain at his leisure the content of the data stored in the volatile data storage device. Thus, the use of passive erasure to protect data stored in a volatile data storage device situated within a secure environment may not be as effective as desired.

Figure 2:
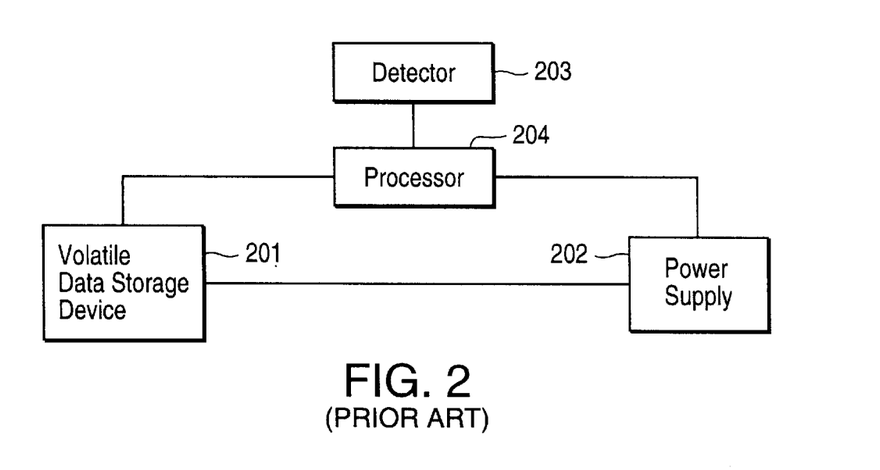
FIG. 2 is a block diagram illustrating the functional components of another previous system for protecting data stored in a volatile data storage device that is situated within a secure environment and connected to a power supply.

FIG. 2 is a block diagram illustrating the functional components of another previous system for protecting data stored in a volatile data storage device that is situated within a secure environment and connected to a power supply. As in the system depicted in FIG. 1, a volatile data storage device 201 that is situated within a secure environment is initially electrically connected to a power supply 202 so that data can be continually stored in the volatile data storage device 201, and a detector 203 is adapted to detect when an intrusion into the secure environment has occurred. When an intrusion is detected, a processor 204 causes data stored within the volatile data storage device 201 to be erased or changed so that the originally stored data cannot be ascertained. The processor 204 may also make use of other devices (not shown), as appropriate or necessary, to effect destruction of the data.

The system depicted in FIG. 2 suffers from disadvantages that may make that system impractical or insufficiently effective to protect data stored in a secure volatile data storage device. For example, the system of FIG. 2 requires maintenance of the power supply to the processor 204 to enable destruction of data within the volatile data storage device 201. However, an intrusion into the secure environment may break the electrical connection between the power supply 202 and the processor 204, thereby preventing the processor 204 from performing the data destruction operation. Even if the processor 204 is able to operate to destroy the data, such operation may take a sufficiently long time that a tamperer is able to disable operation of the processor 204 before the data is completely destroyed. Further, operation of the processor 204 (and, in some implementations of a system as in FIG. 2, other devices) to destroy data and operation of the volatile data storage device 201 to continue storing data may require a relatively large amount of power, such that it may be infeasible to ensure that the power supply 202 will always have enough power to effect the data destruction operation. This may particularly be so in devices which are constructed so that the power supply 202 cannot be replaced easily or at all. For example, in some portable devices, the backup power supply is also situated within the secure environment (e.g., located in an enclosure within a mechanically sealed housing) such that replacement or recharging of the backup power supply is impractical or impossible. Near the end of the useful life of the backup power supply of such a portable device, the backup power supply may not be able to provide sufficient power to enable the data destruction operation to take place. This may be true, in particular, for such portable devices that are also relatively small, since the backup power supply is often embodied by a small device that may, in a relatively short time, lose the capacity to generate the required power. Moreover, in some portable devices, it may not be possible to provide a backup power supply having sufficient power to operate a processor (and, if necessary, other devices) to effect a data destruction operation as described above.

SUMMARY OF THE INVENTION

The invention provides additional protection for data stored in a data storage device situated within a secure environment. As can be appreciated from the description herein, the invention has particular utility when used with a volatile data storage device. The invention provides the additional protection for stored data in a manner that overcomes the above-discussed problems with previous approaches to providing such protection.

As indicated above, the capacity of a volatile data storage device to store data depends upon the maintenance of two distinct voltage levels (referred to herein as "data retention voltages") within the volatile data storage device. The data retention voltages are established by corresponding voltages (which have different magnitudes) at designated input nodes of the volatile data storage device. A power supply is electrically connected to the volatile data storage device to maintain the different voltages at the designated input nodes. According to the invention, when an intrusion into the secure environment is detected, the volatile data storage device is disconnected from the power supply and connected to a clamp which supplies current to or from a clamp reference voltage node from or to, respectively, one or more of the designated input nodes of the volatile data storage device to cause the magnitudes of the voltages at the designated input nodes to become equal, thus erasing data stored in the volatile data storage device. Erasure in this manner of data stored in a volatile data storage device is referred to herein as "active erasure"(or "active zeroization").

Active erasure effects erasure of data in a volatile data storage device much more rapidly than passive erasure (described above). For example, for a volatile data storage device in which tens of seconds are required for the data to be erased by passive erasure, active erasure can erase the data in milliseconds. Active erasure thus precludes a tamperer from re-establishing the connection between the power supply and the volatile data storage device, or providing a substitute power supply, before the data in the volatile data storage device is erased. Thus, the tamperer is prevented from preserving the stored data after intruding into the secure environment so that the tamperer can attempt to ascertain the content of the data at his leisure. In contrast, as described above, passive erasure is susceptible to such efforts to subvert the erasure of data after detection of tampering.

Active erasure also enables data to be rapidly erased without requiring use of a processor (or other device or devices) to effect the erasure or other destruction of data. Thus, active erasure enables the protection of data stored in a secure volatile data storage device to be accomplished in a simpler, more inexpensive manner than is the case in systems (described above) that make use of a processor and/or other device(s) to destroy data after tamper detection. Further, active erasure does not rely upon maintenance of an electrical connection between the power supply and the processor and/or other devices, as those systems do, thus making active erasure more reliable than those systems. Additionally, the clamp of an active erasure system requires relatively little power for operation, so that erasure of data can be confidently guaranteed in situations in which it is, at best, uncertain whether sufficient power will be available to operate a processor and/or other devices to destroy data.

Generally, the invention can be used to protect data stored in any volatile data storage device that is situated within a secure environment and connected to a power supply. It is anticipated that the invention can be particularly useful when implemented in a device (e.g., many portable computational or peripheral devices) that uses a backup power supply (such as a battery) to maintain storage of data in the volatile data storage device when the device is not connected to a primary power supply (e.g., interconnected with a host device that includes or is connected to an operating power supply). Additionally, the invention can be particularly advantageously used in devices in which the backup power supply must be, or is desirably, embodied by a low power device (e.g., a device that operates using a 1.5 volt or 3.3 volt power supply, such as can be the case with relatively small portable devices) and/or in devices that must operate for a relatively long period of time without replacement or recharging of the backup power supply (as can be the case with a device in which the backup power supply is also situated within the secure environment).

DETAILED DESCRIPTION OF THE INVENTION

Figure 3:
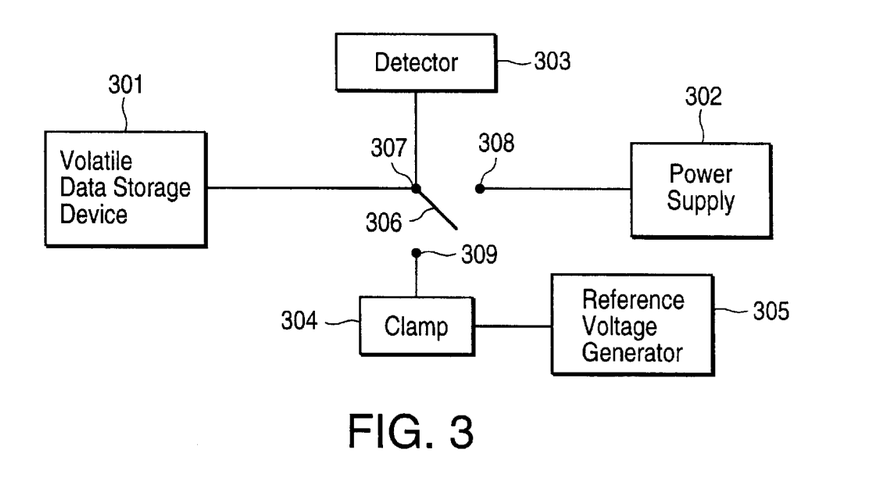
FIG. 3 is a block diagram illustrating the functional components of a system, according to the invention, for protecting data stored in a volatile data storage device that is situated within a secure environment and connected to a power supply.

FIG. 3 is a block diagram illustrating the functional components of a system, according to the invention, for protecting data stored in a volatile data storage device that is situated within a secure environment and connected to a power supply. (In FIG. 3, and in FIGS. 4A, 4B and 5, discussed below, like numerals are used to indicate elements that are, or can be, the same in those figures.)

In FIG. 3, a volatile data storage device 301 is situated in a secure environment. Ways in which a secure environment can be established are discussed in greater detail below.

Normally, the volatile data storage device 301 is electrically connected to a power supply 302 (i.e., a switch 306 is configured to make connection between nodes 307 and 308) so that data can be continually stored in the volatile data storage device 301. The power supply 302 may also be situated within the secure environment, though this need not necessarily be the case.

A detector 303 is adapted, as described in more detail below, to detect an intrusion into the secure environment. When an intrusion is detected, the power supply 302 is disconnected from the volatile data storage device 301 so that power is no longer supplied to the volatile data storage device 301, and a clamp 304 is connected to the volatile data storage device 301 so that, as explained in more detail below, electrical current is either supplied from a reference voltage generator 305 to the volatile data storage device 301 or sourced to the reference voltage generator 305 from the volatile data storage device 301 to effect erasure of data stored in the volatile data storage device 301 (i.e., the configuration of the switch 306 is changed so that the switch 306 makes connection between nodes 307 and 309, rather than nodes 307 and 308). While the detector 303, clamp 304 and reference voltage generator 305 also need not necessarily be situated in the secure environment, the detector 303, clamp 304 and reference voltage generator 305 must be protected in some manner from tampering (at least prior to erasure of the data in the volatile data storage device 301 by the system of the invention). Typically, this can easily be accomplished by including the detector 303, clamp 304 and reference voltage generator 305 within the secure environment or as part of structure defining the secure environment.

As described above, volatile data storage devices typically require maintenance of two voltage levels (data retention voltages) within the volatile data storage device to enable one of two distinct values to be stored in each memory cell of the volatile data storage device, data being stored in the volatile data storage device by selectively storing one of the two distinct values in particular memory cells. The data retention voltages are established by the voltages at designated input nodes of the volatile data storage device. In the system of FIG. 3, the clamp 304 supplies current to or from the reference voltage generator 305 from or to, respectively, one or more such designated input nodes of the volatile data storage device 301 so that the voltages at the designated input nodes become equal, i.e., the voltages at the designated input nodes all become equal to a clamp reference voltage produced by the reference voltage generator 305. When the voltages at the designated input nodes become equal, the data retention voltages in the volatile data storage device 301 become equal as well. Since the data retention voltages are equal, each memory cell of the volatile data storage device 301 stores the same value and, thus, all of the data stored in the volatile data storage device 301 is effectively erased. (Note that operation of the invention may not cause the voltages at the designated input nodes to all be exactly equal, but to be, instead, "substantially equal," such term being used herein, in reference to the voltages at the designated input nodes, to indicate that the voltages at those nodes differ in magnitude by less than an amount necessary to produce distinct data retention voltages that enable data storage in the volatile data storage device. It should also be noted that, herein, when voltages at designated input nodes are said to be equal, such voltages can also be "substantially equal," in accordance with the definition above. Similarly, the data retention voltages are said to be equal or substantially equal when the data retention voltages differ by less than an amount that enables storage of two distinct values in the memory cells of the volatile data storage device. Further, the voltages at the designated input nodes or the data retention voltages are "different" when the voltages are not equal or substantially equal as defined above.)

As indicated above, erasure of data stored in a volatile data storage device in the above-described manner is referred to herein as "active erasure," while "passive erasure" is used herein to refer to an above-described previous method of erasing data stored in a volatile data storage device. While both active erasure and passive erasure cause a power supply to be disconnected from a volatile data storage device to allow the data within the volatile data storage device to be erased (by allowing the data retention voltages of the volatile data storage device to become equal), passive erasure does nothing more than that, while active erasure does. As described above, active erasure clamps the data retention voltages to be equal (by clamping the voltages at the designated input nodes of the volatile data storage device to be equal to a clamp reference voltage). Consequently, active erasure effects erasure of data in a volatile data storage device much more rapidly than passive erasure. As indicated above, passive erasure can take an undesirably long time (e.g., tens of seconds) to erase data, thus affording a tamperer the opportunity to re-establish the connection between the power supply and the volatile data storage device, or provide a substitute power supply, so that the data stored in the volatile data storage device can be preserved after an intrusion, thereby providing the tamperer with an unlimited amount of time to attempt to ascertain the content of the data. Active erasure, on the other hand, can erase data stored in a volatile data storage device almost immediately (e.g., for a volatile data storage device in which tens of seconds are required for the data to be erased by passive erasure, active erasure can erase the data in microseconds), thus preventing a tamperer from acting to preserve the stored data before it can be erased.

Active erasure also enables stored data to be rapidly erased without requiring use of a processor (or other device or devices) to effect erasure or other destruction of the stored data. Thus, active erasure enables the protection of data stored in a volatile data storage device to be accomplished in a simpler, more inexpensive manner than is the case in systems (described above) that make use of a processor (and/or other devices) to destroy stored data after tamper detection. Further, active erasure does not rely upon maintenance of an electrical connection between a power supply and the processor and/or other devices, as those systems do, thus providing increased reliability in protection of the stored data, since the breaking of such electrical connection (which can often occur as a result of the tampering with the secure environment) does not impair erasure of the data stored in the volatile data storage device. Additionally, as will be apparent from the description below of particular implementations of the invention, the clamp of an active erasure system according to the invention requires relatively little power for operation (typically several orders of magnitude less than the power required by a system that uses a processor to destroy the stored data), so that erasure of data can be confidently guaranteed for secure devices near the end of the useful life of a power supply used by the secure device, in applications in which the secure device makes use of a relatively small power supply, or in other situations in which relatively little power is available to effect data erasure or destruction.

The invention provides additional protection for data stored in a volatile data storage device that already is protected to some degree by being situated within a secure environment. Herein, "secure environment" can refer generally to any environment into which an intrusion can be detected. In many applications for which the invention can be used, such an environment is a defined spatial region. However, this need not necessarily be the case: "environment" may also refer to, for example, the points of electrical ingress to, and egress from, a volatile data storage device, an "intrusion" into such environment being an access to the volatile data storage device via one of those points that is of a type that has been defined to be unauthorized or otherwise unacceptable.

The secure environment can be established in any appropriate manner. In many applications of the invention, the secure environment is an enclosure within a mechanically sealed housing. However, the secure environment can be established in other ways. For example, a secure environment can be a spatial region that is defined by a magnetic field or fields, an intrusion being detected as a predefined change in the magnetic field or fields. The secure environment can also be a spatial region that is defined by one or more optical beams, an intrusion being detected when an object passes into or through one or more of the optical beams so as to produce a discontinuity in the beam(s). Or, for example, the secure environment can be established by providing electronic apparatus that monitors the character of each attempted electrical access to the volatile data storage device, as discussed above.

Generally, the invention can be used to protect data stored in any type of volatile data storage device, such as, for example, a random access memory (RAM). Further, the invention is useful at any time the volatile data storage device is connected to a power supply of any type. In particular, however, the invention can advantageously be used with a secure device (and, even more particularly, in such a device that is portable) in which a volatile data storage device is effectively made non-volatile by using a backup power supply (e.g., a battery) to supply power to the volatile data storage device when the secure device is not being used. When used with such a secure device, the invention can effectively thwart tampering with the secure device that occurs when the secure device is not being used.

A detector for use with the invention can be implemented in any appropriate manner. In particular, the manner in which the detector is implemented can be dependent upon the nature of the secure environment within which the volatile data storage device is situated, e.g., a secure environment defined by a mechanically sealed housing will typically result in use of a different detector than that used when the secure environment is defined by a magnetic field. For example, as described in detail below with respect to FIG. 6 for one particular embodiment of a secure device in accordance with the invention, when the secure environment is an enclosure within a mechanically sealed housing, the detector can be an electrical circuit that is opened when an intrusion into the housing occurs. Or, for example, when the secure environment is defined by a magnetic field, the detector can be apparatus for detecting a change in the magnetic field, as known to those skilled in that art. similarly, appropriate apparatus, as known to those skilled in the relevant arts, can be used to detect intrusion into optically or electrically defined secure environments.

The functional switch that changes configuration in response to detection of an intrusion into the secure environment, so that the power supply is disconnected from the volatile data storage device and the clamp is connected to the volatile data storage device, can also be embodied in any appropriate manner. For example, such switching can be implemented using the same electrical circuit (discussed above) used to detect an intrusion into a secure environment embodied as an enclosure within a mechanically sealed housing, as illustrated below in FIGS. 5 and 6. Other ways of implementing such switching functionality can be appropriate for other embodiments of secure environments, as can be readily understood by those skilled in the arts relevant to establishment of those secure environments.

Figure 5:
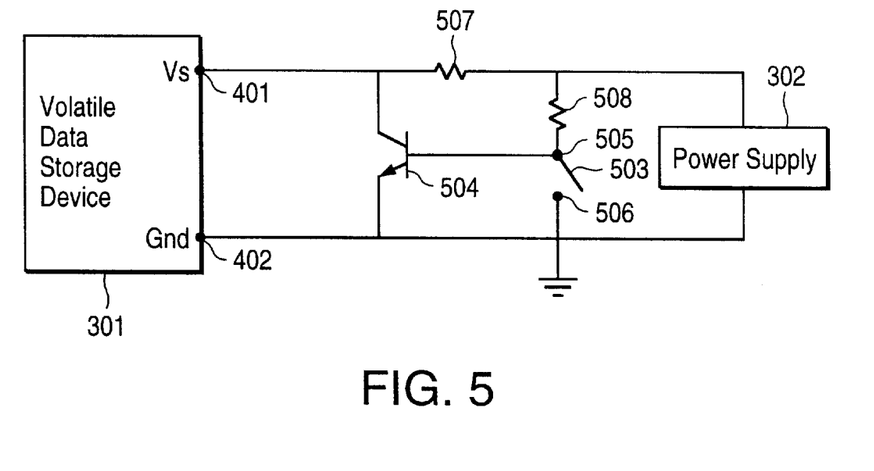
FIG. 5 is a diagram of a system according to a particular implementation of the embodiment of the invention shown in FIG. 4A.

A clamp for use with the invention can also be implemented in any appropriate manner. For example, as shown in FIG. 5, discussed below, the clamp can be implemented using a single transistor that is appropriately connected to electrical nodes of the secure device in which the system of the invention is implemented, so that current flows along a desired path in response to detection of an intrusion into the secure environment. In general, any type of transistor can be used to embody the clamp. Those skilled in the art will appreciate how to specify the particular characteristics of a transistor (or other device or devices) used to embody a clamp in accordance with the invention in order to achieve particular clamping characteristics and/or appropriately interact with other components of the secure device, particularly in view of the description of embodiments of the invention herein (see, e.g., the description of FIG. 5 below). A clamp for use with the invention can also be implemented by an integrated circuit configured as an analog switch which, in response to detection of an intrusion, switches from a high impedance state to a low impedance state (i.e., allows current to flow). Or, a clamp for use with the invention can be implemented by an integrated circuit configured as a combinatorial logic circuit which, in response to detection of an intrusion, establishes appropriate voltage levels so that the voltages at the designated input nodes of the volatile data storage device become equal.

A reference voltage generator for use with the invention can, too, be implemented in any appropriate manner. Typically, the voltage at one of the designated input nodes (or set of nodes) of a volatile data storage device is equal to a ground voltage of a secure device of which the volatile data storage device is part, while the voltage at the other of the designated input nodes (or set of nodes) is equal to a supply voltage of the secure device (e.g., a voltage that differs from the ground voltage by approximately the amount of the voltage drop across the power supply). (Hereinafter, the former node or set of nodes is referred to as the "ground node" of the volatile data storage device, while the latter node or set of nodes is referred to as the "supply node" of the volatile data storage device.) A system according to the invention can be implemented, for example, so that the clamp reference voltage produced by the reference voltage generator is equal to the ground voltage or to the supply voltage of the secure device. In such case, the reference voltage generator can be embodied simply as a node of the secure device having the appropriate voltage, no additional apparatus being need to produce a clamp reference voltage of the desired magnitude.

Figure 4A:
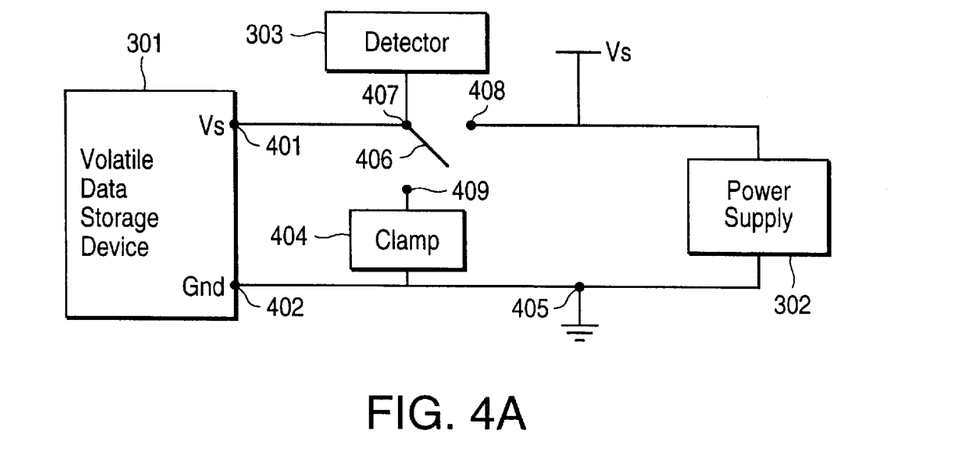
FIG. 4 is a block diagram of a system according to an embodiment of the invention.

FIG. 4A is a block diagram of a system, according to an embodiment of the invention, that is implemented so that the clamp reference voltage is equal to a ground voltage of a secure device in which the system of the invention is implemented (i.e., the reference voltage generator 305 of FIG. 3 can be embodied by any node in FIG. 4A, such as the node 405, that is held at the ground voltage). In such an embodiment, when an intrusion is detected by the detector 303, the switch 406 disconnects nodes 407 and 408 (i.e., disconnects the power supply 302) and connects the nodes 407 and 409 so that the clamp 404 sources current from the supply node 401 of the volatile data storage device 301 until the voltage at the supply node 401 is equal to the ground voltage at the ground node 402 of the volatile data storage device 301.

Figure 4B:
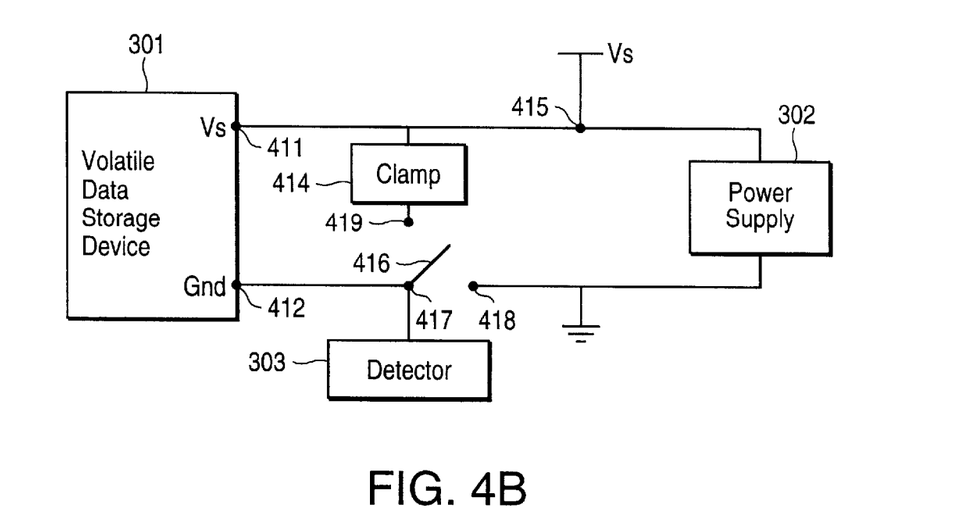
FIG. 4B is a block diagram of a system according to another embodiment of the invention.

FIG. 4B is a block diagram of a system, according to another embodiment of the invention, that is implemented so that the clamp reference voltage is equal to a supply voltage of the secure device in which the system of the invention is implemented (i.e., the reference voltage generator 305 of FIG. 3 can be embodied by any node in FIG. 4B, such as the node 415, that is held at the supply voltage). In such an embodiment, when an intrusion is detected by the detector 303, the switch 416 disconnects nodes 417 and 418 (i.e., disconnects the power supply 302) and connects the nodes 417 and 419 so that the clamp 414 supplies current to the ground node 412 of the volatile data storage device 301 until the voltage at the ground node 412 is equal to the supply voltage at the supply node 411 of the volatile data storage device 301.

More generally, the clamp reference voltage can have any desired appropriate value and can be generated using any appropriate device or devices. For example, the circuit illustrated in FIG. 5 (described below) could be modified, as can be understood by those skilled in the art, to produce a clamp reference voltage that is intermediate the ground and supply voltages. In such an embodiment, the clamp can be configured to source current from the supply node of the volatile data storage device and supply current to the ground node of the volatile data storage device so that the voltages at the supply and ground nodes become equal to the clamp reference voltage.

FIG. 5 is a diagram of a system according to a particular implementation of the embodiment of the invention shown in FIG. 4A. In FIG. 5, the clamp 404 of the system shown in FIG. 4A is embodied by the transistor 504. The detector 303 of the system shown in FIG. 4A is embodied by the switch 503, which also embodies the switch 406 of the system shown in FIG. 4A.

During normal operation of a secure device including the system depicted in FIG. 5, the switch 503 is closed (i.e., configured to connect the nodes 505 and 506), connecting the power supply 302 to the volatile data storage device 301 so that the data stored in the volatile data storage device 301 are preserved. Additionally, when the switch 503 is closed, the voltage at the node 505 is equal to the ground voltage of the secure device, turning the transistor 504 off (i.e., preventing current from flowing through the transistor 504). Intrusion into the secure environment causes the switch 503 to open, disconnecting the power supply 302 and creating an open circuit between the node 505 and the node 506 (i.e., the ground voltage) in the secure device. The voltage at the node 505 rapidly rises to approximately the supply voltage of the secure device, turning the transistor 504 on (i.e., allowing current to flow through the transistor 504). The current flow through the transistor 504 causes the voltage at the supply node 401 of the volatile data storage device 301 to become equal to the voltage at the ground node 402 of the volatile data storage device 301, thus erasing the data stored within the volatile data storage device 301.

The resistance of the resistor 507 is chosen in view of the desirability of minimizing the voltage drop across the resistor 507 during normal operation of the secure device and the need to limit the current drain on the power supply 302 when the transistor 504 is turned on as a result of detection of tampering. The resistance of the resistor 508 is chosen in view of the desirability of minimizing the current drain on the power supply 302 during normal operation of the secure device and the need to ensure that sufficient current flows through the resistor 508 to turn the transistor 504 on when the switch 503 is opened as a result of detection of tampering. Illustratively, when the voltage differential across the power supply 302 is about 3 volts, the resistor 507 can have a resistance of about 470 ohms and the resistor 508 can have a resistance of about 27 megohms. During normal operation of the secure device, these resistance values result in a voltage drop across the resistor 507 of about 1 microvolt and a current flow through the resistor 508 of about 1 microamp.

As shown in FIG. 5, the transistor 504 must be an N-P-N transistor. Generally, depending on other characteristics of the electrical configuration of a system according to the invention, the transistor 504 can be implemented by any appropriate transistor, including bipolar and FET transistors.

The implementation of a system according to the invention as shown in FIG. 5 requires very little power (e.g., on the order of microwatts) to erase data in the volatile data storage device 501, can be produced at very low cost, and can be implemented in a very small area. Each of these characteristics make such an implementation particularly useful in small and/or portable secure devices.

Figure 6:
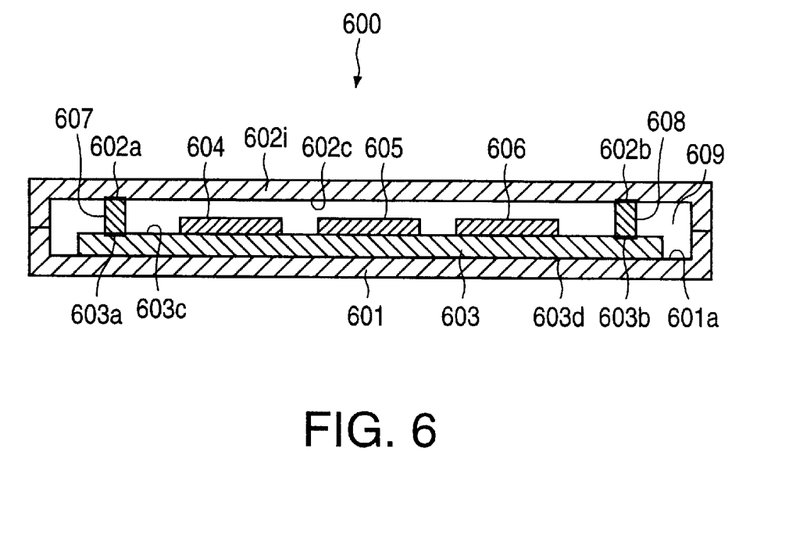
FIG. 6 is a simplified cross-sectional view of a secure device in which the invention can be implemented, illustrating, in particular, one embodiment of a detector in accordance with the invention.

FIG. 6 is a simplified cross-sectional view of a secure device 600 in which the invention can be implemented, illustrating, in particular, one embodiment of a detector in accordance with the invention. The construction of a device 600 as described below can be accomplished using well-known techniques and materials, as known by those skilled in the art.

The device 600 includes a housing that is formed by attaching a first housing section 601 to a second housing section 602 so that a sealed enclosure 609 (the secure environment) is formed within the housing. Such a housing can be, for example, a card-like housing having, for example, a PCMCIA form factor.

A surface 603d of a printed circuit board 603 is attached to a surface 601a of the housing section 601 within the enclosure 609. Electronic devices 604, 605 and 606 (three electronic devices are shown merely for purposes of illustration; generally any number of electronic devices can be present) are attached to a surface 603c of the printed circuit board 603 opposite the surface 603d. Electrical interconnection between the electronic devices 604, 605 and 606 can be accomplished via electrically conductive traces formed on the surface 603c of the printed circuit board 603. The electronic devices 604, 605 and 606 can be, for example, integrated circuit chips designed to accomplish particular aspects of the desired functionality of the device 600 (e.g., the electronic device 604 could be the volatile data storage device, the electronic device 605 could be a processor, etc.).

An electrically conductive spring 607 is positioned between an electrically conductive region 602a formed on the surface 602c of the housing section 602 and an electrically conductive region 603a formed on the surface 603c of the printed circuit board 603. Similarly, an electrically conductive spring 608 is positioned between an electrically conductive region 602b formed on the surface 602c of the housing section 602 and an electrically conductive region 603b formed on the surface 603c of the printed circuit board 603. An electrically conductive trace is formed on the surface 603c of the printed circuit board 603 to make electrical connection between the regions 603a and 603b, and an electrically conductive trace is formed on the surface 602c of the housing section 602 to make electrical connection between the regions 602a and 602b. The spring 607, the trace between the regions 602a and 602b, the spring 608, and the trace between the regions 603a and 603b thus form an electrical circuit. This circuit represents the detector (e.g., detector 303 in FIG. 3) of a system according to the invention formed as part of the device 600. This circuit can also represent the switch (e.g., switch 306 in FIG. 3) that either connects the power supply or the clamp to the volatile data storage device within the enclosure 609. (For convenience, this circuit is referred to hereinafter as the "detector circuit.") The springs 607 and 608 can be formed with an unstressed length such that the springs 607 and 608 are compressed when the housing sections 601 and 602 are attached together, the spring constant of the springs 607 and 608 and the nominal amount of compression being specified to produce a spring force adequate to hold the springs 607 and 608 in place during the anticipated conditions of use of the device 600. Any appropriate type of spring (e.g., a small coil spring or a spring clip) can be used to embody the springs 607 and 608.

If the housing of the device 600 is pried apart, the springs 607 and 608 will be dislodged from their positions within the enclosure 609 so that the detector circuit is broken. The breaking of the detector circuit acts as the opening of a switch that indicates that an intrusion into the enclosure 609 has occurred, and can also, as indicated above, cause the volatile data storage device of the device 600 to be disconnected from the power supply of the device 600 and connected to the clamp of the system of the invention. In other words, the detector circuit of the device 600 can be an embodiment of the switch 503 depicted in FIG. 5. (The other components of a system according to the invention—for example, as depicted in FIG. 5, the resistors 507 and 508, and the transistor 504—can be formed on the printed circuit board 603 or on one or more of the electronic devices 604, 605 or 606 as appropriate or desirable.)

It can be possible to use only one spring in a detector circuit in the secure device 600. Such a detector circuit could be formed by a spring extending between opposing electrically conductive regions formed on the surface 602c of the housing section 602 and the surface 601a of the housing section 601, and electrically conductive traces formed on or within the housing sections 601 and 602 that extend from the electrically conductive regions and that are electrically connected by additional electrically conductive regions formed on the housing sections 601 and 602 that contact each other when the housing sections 601 and 602 are attached.

In general, any number of springs can be used as part of a detector circuit in a manner similar to that described above. The more springs that are used the more reliable the detector circuit will be in detecting intrusions into the secure environment. Additionally, the greater the area over which springs are distributed, the less likely it is that a tamperer can intrude into the secure environment without dislodging at least one of the springs. However, each additional spring adds to the material cost and the complexity of construction of the secure device. The particular number of springs used and the location of springs within the secured environment can be established, as desired, in view of the tradeoffs inherent in the above-identified considerations.

Another type of structure (e.g., a wire or small post) can be used in a secure device in place of springs, as described above, so long as the structure can be configured or attached to the housing sections 601 and 602 so that the structure is held in place within the enclosure 609 in such a manner that the structure becomes dislodged when an intrusion into the secure environment occurs.

Various embodiments of the invention have been described. The descriptions are intended to be illustrative, not limitative. Thus, it will be apparent to one skilled in the art that certain modifications may be made to the invention as described herein without departing from the scope of the claims set out below. For example, the opening or closing of a switch described above should be taken more generally to mean a change in state of the switch so that, for example, when a switch is described above as changing from being closed to being opened, it is to be understood that it may also be possible to implement the switch so that the switch changes from being opened to being closed.

I claim:

1. A system for protecting data stored in a data storage device situated within a secure environment of a secure device, wherein the capacity of the data storage device to store data depends upon the presence of a voltage at a first input node or nodes of the data storage device having a magnitude that is different from the magnitude of a voltage at a second input node or nodes of the data storage device, the system comprising:

a detector for detecting an intrusion into the secure environment; and a clamp for supplying current to or from a clamp reference voltage node from or to, respectively, the first node or nodes and/or the second node or nodes to cause the magnitude of the voltages at the first and second nodes to become equal, the clamp supplying current in response to detection of an intrusion by the detector.

2. A system as in claim 1, wherein the clamp comprises a transistor.

3. A system as in claim 1, wherein the clamp comprises an analog switch.

4. A system as in claim 1, wherein the clamp comprises a combinatorial logic circuit.

5. A system as in claim 1, wherein the clamp reference voltage is a ground voltage of the secure device.

6. A system as in claim 1, wherein the clamp reference voltage is a supply voltage of the secure device.

7. A system as in claim 1, wherein the detector comprises an electrical switch that changes state in response to an intrusion.

8. A system as in claim 7, wherein:
the secure environment comprises an enclosure within a mechanically sealed housing; and
the electrical switch comprises a first electrically conductive region formed in or on the housing that is in contact with a second electrically conductive region formed in or on the housing such that an intrusion into the enclosure can cause the contact between the first and second electrically conductive regions to be broken.

9. A system as in claim 8, wherein the electrical switch further comprises an electrically conductive spring positioned between the first and second electrically conductive regions, such that an intrusion into the enclosure can cause the spring to be dislodged to break contact between the first and second electrically conductive regions.

10. A system as in claim 9, wherein the electrical switch further comprises:
a first plurality of electrically conductive regions formed in or on the housing;
a second plurality of electrically conductive regions formed in or on the housing; and
a plurality of electrically conductive springs, each of which is positioned between corresponding first and second electrically conductive regions, such that an intrusion into the enclosure can cause one or more of the springs to be dislodged to break contact between the corresponding first and second electrically conductive regions.

11. A system as in claim 1, wherein the secure environment comprises an enclosure within a mechanically sealed housing.

12. A system as in claim 1, wherein the secure environment comprises a space defined by one or more magnetic fields.

13. A system as in claim 1, wherein the secure environment comprises a space defined by one or more optical beams.

14. A system as in claim 1, wherein the secure environment comprises an electrical space established by monitoring the points of electrical ingress to, and egress from, the data storage device to determine whether each access to the volatile data storage device via one of those points is of a type that has been defined to be unauthorized or otherwise unacceptable.

15. A system as in claim 1, wherein:
the secure device includes a backup power supply that is normally connected to the data storage device to supply power to the data storage device when the secure device is not operating so that the difference between the magnitudes of the voltage at the first input node or nodes and the voltage at the second input node or nodes is maintained; and
the system further comprises means for disconnecting the backup power supply from the data storage device in response to detection of an intrusion by the detector.

16. A system as in claim 15, wherein the secure device is a portable device.

17. A system as in claim 1, wherein the clamp reference voltage is a voltage intermediate a ground voltage and a supply voltage of the secure device.

18. A method for protecting data stored in a data storage device situated within a secure environment of a secure device, wherein the capacity of the data storage device to store data depends upon the presence of a voltage at a first input node or nodes of the data storage device having a magnitude that is different from the magnitude of a voltage at a second input node or nodes of the data storage device, the method comprising the steps of:
detecting an intrusion into the secure environment; and
supplying current to or from a clamp reference voltage node from or to, respectively, the first node or nodes and/or the second node or nodes to cause the magnitude of the voltages at the first and second nodes to become equal, the step of supplying current being performed in response to detection of an intrusion by the detector.

19. A system for protecting data stored in a data storage device situated within a secure environment of a secure device, wherein the capacity of the data storage device to store data depends upon the presence of a voltage at a supply node of the data storage device having a magnitude that is different from the magnitude of a voltage at a ground node of the data storage device, the system comprising:
a transistor, comprising:
a first current handling node connected to the supply node of the data storage device;
a second current handling node connected to the ground node of the data storage device, and to a ground voltage of a power supply and the secure device; and
a current control node;
a first resistor comprising:
a first node connected to the supply node of the data storage device and to the first current handling node of the transistor; and
a second node connected to a supply voltage of the power supply;
a second resistor comprising:
a first node connected to the supply voltage of the power supply and to the second node of the first resistor; and
a second node connected to the current control node of the transistor; and
a switch comprising:
a first node connected to the current control node of the transistor and to the second node of the second resistor; and
a second node connected to the ground node of the data storage device, to the second current handling node of the transistor, and to the ground voltage of the power supply and the secure device, wherein:
during normal operation of the secure device, the switch is closed so that the current control node of the transistor is connected to the ground node of the data storage device and to the ground voltage of the power supply and the secure device, so that the transistor is turned off to prevent current from flowing between the first and second current handling nodes of the transistor, thus maintaining a voltage at the supply node of the data storage device that is different from the voltage at the ground node of the data storage device and thereby enabling data to be stored in the data storage device; and detection of intrusion into the secure environment causes the switch to open so that the current control node of the transistor is disconnected from the ground node of the data storage device and from the ground voltage of the power supply and the secure device, thus causing the voltage at the current control node of the transistor to increase to a magnitude that turns the transistor on to allow current to flow between the first and second current handling nodes of the transistor, thus causing the voltage at the supply node of the data storage device to become equal to the voltage at the ground node of the data storage device and thereby erasing the data stored in the data storage device.

20. A system as in claim 19, wherein:

the first resistor has a resistance of about 470 ohms;

the second resistor has a resistance of about 27 megohms; and the difference between the supply voltage of the power supply and the ground voltage of the power supply is about 3 volts.

21. A method as in claim 17, wherein the step of supplying current to or from the clamp reference voltage node further comprises the step of supplying current to or from the clamp reference voltage node with a transistor.

22. A method as in claim 17, wherein the step of supplying current to or from the clamp reference voltage node further comprises the step of supplying current to or from the clamp reference voltage node with an analog switch.

23. A method as in claim 17, wherein the step of supplying current to or from the clamp reference voltage node further comprises the step of supplying current to or from the clamp reference voltage node with a combinatorial logic circuit.

24. A method as in claim 17, wherein the clamp reference voltage is a ground voltage of the secure device.

25. A method as in claim 17, wherein the clamp reference voltage is a supply voltage of the secure device.

26. A method as in claim 17, wherein the step of detecting an intrusion into the secure environment further comprises the step of detecting a change in state of an electrical switch in response to the intrusion.

27. A method as in claim 26, wherein:

the secure environment comprises an enclosure within a mechanically sealed housing;

the electrical switch comprises a first electrically conductive region formed in or on the housing that is in contact with a second electrically conductive region formed in or on the housing; and the step of detecting a change in state of the electrical switch in response to the intrusion further comprises the step of detecting the breaking of contact between the first and second electrically conductive regions.

28. A method as in claim 27, wherein:

the electrical switch further comprises an electrically conductive spring positioned between the first and second electrically conductive regions; and the step of detecting the breaking of contact between the first and second electrically conductive regions further comprises the step of detecting dislodgement of the spring that breaks contact between the first and second electrically conductive regions.

29. A method as in claim 28, wherein:

the electrical switch further comprises:

a first plurality of electrically conductive regions formed in or on the housing;

a second plurality of electrically conductive regions formed in or on the housing; and a plurality of electrically conductive springs, each of which is positioned between corresponding first and second electrically conductive regions; and the step of detecting the breaking of contact between the first and second electrically conductive regions further comprises the step of detecting dislodgement of one or more of the springs that breaks contact between the corresponding first and second electrically conductive regions.

30. A method as in claim 17, wherein the secure environment comprises an enclosure within a mechanically sealed housing.

31. A method as in claim 17, wherein the secure environment comprises a space defined by one or more magnetic fields.

32. A method as in claim 17, wherein the secure environment comprises a space defined by one or more optical beams.

33. A method as in claim 17, wherein the secure environment comprises an electrical space established by monitoring the points of electrical ingress to, and egress from, the data storage device to determine whether each access to the volatile data storage device via one of those points is of a type that has been defined to be unauthorized or otherwise unacceptable.

34. A method as in claim 17, wherein:

the secure device includes a backup power supply that is normally connected to the data storage device to supply power to the data storage device when the secure device is not operating so that the difference between the magnitudes of the voltage at the first input node or nodes and the voltage at the second input node or nodes is maintained; and the method further comprises the step of disconnecting the backup power supply from the data storage device in response to detection of an intrusion.

35. A method as in claim 34, wherein the secure device is a portable device.

36. A method as in claim 17, wherein the clamp reference voltage is a voltage intermediate a ground voltage and a supply voltage of the secure device.

* * * * *